United States Patent [19]

Gardziella et al.

[11] Patent Number: 5,300,593
[45] Date of Patent: Apr. 5, 1994

[54] LIGNIN MODIFIED BINDING AGENTS

[75] Inventors: Arno Gardziella, Witten-Rüdinghausen; Achim Hansen, Iserlohn-Letmathe; Stephan Schröter, Essen; Josef Suren, Wünnenberg Haaren, all of Fed. Rep. of Germany

[73] Assignee: Rutgerswerke Aktiengesellschaft AG, Fed. Rep. of Germany

[21] Appl. No.: 108,111

[22] Filed: Aug. 17, 1993

Related U.S. Application Data

[62] Division of Ser. No. 966,298, Oct. 26, 1992, Pat. No. 5,260,405.

Foreign Application Priority Data

Nov. 7, 1991 [DE] Fed. Rep. of Germany ....... 4136563

[51] Int. Cl.$^5$ .............................................. C08G 8/34
[52] U.S. Cl. ..................................... 525/489; 528/129; 528/158; 528/162; 528/230; 528/265; 528/266; 525/54.4; 525/54.42; 525/398; 525/480; 525/486; 525/495; 525/534
[58] Field of Search ............... 528/129, 158, 162, 230, 528/265, 266; 525/54.4, 54.42, 398, 480, 485, 489, 495, 534; 530/520

[56] References Cited

U.S. PATENT DOCUMENTS

| | | | |
|---|---|---|---|
| 2,956,033 | 10/1960 | Apel et al. | 527/403 |
| 3,017,303 | 1/1962 | Ayers | 428/529 |
| 4,058,403 | 11/1987 | Funabiki et al. | 501/99 |
| 4,072,531 | 2/1978 | Funabiki et al. | 523/140 |
| 4,105,606 | 8/1978 | Forss et al. | 524/73 |
| 4,194,996 | 3/1980 | Babina | 523/208 |
| 4,239,666 | 12/1980 | Jacko et al. | 523/157 |
| 4,320,036 | 3/1982 | Gobran et al. | 524/14 |
| 4,469,858 | 9/1984 | Chen | 528/129 |
| 5,010,156 | 4/1991 | Cook et al. | 527/403 |

*Primary Examiner*—John Kight, III
*Assistant Examiner*—S. A. Acquah
*Attorney, Agent, or Firm*—Bierman and Muserlian

[57] ABSTRACT

A binding agent for molding compositions and molded bodies produced by reacting a low molecular weight lignin from the Organosolv process with phenol in a weight ratio of 1:20 to 3:1 at 100° to 180° C., adjusting the pH to an acidic value and condensing the mixture with 0.2 to 0.9 moles of formaldehyde per mole of phenol at 60° to 120° C. to form the binding agent useful for producing curable molding compositions, high-temperature molding compositions, refractory products, textile fleeces and friction coatings as well as carbon materials.

8 Claims, No Drawings

LIGNIN MODIFIED BINDING AGENTS

This is a division of Ser. No. 966,298, filed Oct. 26, 1992, now U.S. Pat. No. 5,260,405.

STATE OF THE ART

In the field of carbon-forming binding agents for carbon materials, sinter compositions and refractory products, primarily tar or pitch comprising polycyclic hydrocarbons were previously used as starting material for good carbon formation. Synthetic resins, particularly furan and phenol resins, are today increasingly gaining in importance as binding agents. In the resin state, they are free of toxic polycyclic hydrocarbons such as benzo-a-pyrene, and during pyrolysis develop them only to a slight degree. Moreover, they avoid smoke and soot development at increased temperatures and simultaneously improve the quality and the processibility of the refractory compositions. However, in comparison to binding agents produced from tar, these resins are rather expensive. In the meantime, as a by-product of the chemical pulp production, a phenol-containing polymer, lignin, is obtained in large quantities as a component of the so-called black liquors or sulfite liquors in which it is dissolved as phenolate.

A small portion of this lignin is used as binding agent for press boards of low quality, as dispersion agents, as foam stabilizers, as stabilizers for asphalt emulsions or for other purposes. The greatest portion of the resulting lignin, however, until now since it could not be disposed of in other ways, was burned and served in this way as inexpensive energy source for the chemical pulp digestion although it could conceivably be used as a high-quality regrowing raw material for products produced previously of basic materials generated from coal or mineral oil.

In spite of intensive investigations no suitable process has been found until now which makes possible replacing or even only diluting binding agent mixtures based on phenol resins by or with lignin resins while maintaining the quality features.

The sulfurized lignin from the chemical pulp digestion or from the Kraft process is per se less active but can be reactivated by conversion with phenol in the presence of an acid and can be converted through subsequent reaction with formaldehyde to form a resin which can be mixed with phenol resin. Sulfurized lignin which has been converted with formaldehye in the presence of a base and subsequently condensed with phenol is also suitable as a diluting means for phenol resins (Sundström et al., Biotech. Bioeng. Symp. Vol. 12, p. 45 to 56 (1982).

However, it has been found that the sulfurized lignin derivatives cannot be mixed in any given quantity with phenol resins since they have a very high viscosity and the adhesive force of the resin mixture decreases strongly with increasing lignin content. A phenol resin comprising 10% lignin sulfonic acid derivative already shows no satisfactory properties and is relatively sensitive to moisture.

Resins which can be produced in the same manner using Kraft lignin or alkali metal lignin fractions behave similar to these lignin sulfonic acid resin mixtures. Attempts have also been made to partially replace phenol resins with Organosolv lignin. Under comparatively mild conditions, this lignin is extracted in two stages in nearly chemically unchanged form from the wood used. Wood shavings pretreated with steam and an alcohol-water mixture are extracted in a first step with an alcohol-water mixture at nearly 200° C. and high pressure and a weakly acidic solution comprising lignin is obtained. The partially extracted wood shavings are subsequently treated with an alkaline solution comprising for example a methanol-water-sodium hydroxide mixture which is mixed with a small amount of a catalyst. From both of these extractions carried out continuously is continuously obtained an alkaline solution saturated with low-molecular weight lignins, hemicellulose and cellulose. It is distilled off from the alcohol to 90% to obtain the so-called black liquor. From both fractions, the lignin therein can be separated in powder form and it is soluble in ketones such as acetone or in special alcohols such as furfuryl alcohol and can be mixed in this form with a novolac.

A mixture of lignin to phenol novolac at a weight ratio of 1:1 and textile fibers as filler substance for the production of textile fleece, however, yields at a solid resin content of together approximately 30% (relative to the weight of the total mixture) a strong decrease of the cold and hot flexural strength in comparison to conventional phenol novolacs. The strength decreases even greater with increasing lignin component.

Attempts to improve the properties of the Organosolv lignin through different processes during the prereaction with phenol and formaldehyde lead to no significant success. In this way, two resin mixtures can be obtained which are suitable for the production of press and laminate boards as well as for laminating wood veneers, but high-quality products such as high temperature-stable molding substances, refractory products and particuarly friction coatings, cannot be produced with it since the desired property profiles of these products such as the carbon yield and the strength do not meet the requirements.

OBJECTS OF THE INVENTION

It is an object of the invention to provide improved and inexpensive binding agents and binding agent mixtures with excellent properties for refractory products, textile fleeces, friction coatings and molding compositions.

It is another object of the invention to provide novel processes for the production of binding agents and binding agent compositions.

These and other objects and advantages of the invention will become obvious from the following detailed description.

THE INVENTION

The novel ------ng agents of the invention are produced by reacting a low molecular weight lignin from the Organosolv process with phenol in a weight ratio of 1:20 to 3:1 at 100° to 180° C., adjusting the pH to an acidic value and condensing the mixture with 0.2 to 0.9 moles of formaldehyde per mole of phenol at 60° to 120° C. to form the binding agent. The lignin-phenol novolac so produced is useful as a binding agent for curable molding compositions, molded bodies, press compositions, textile fleeces, refractory compositions and friction coatings.

The binding agent mixtures of the invention are prepared by reacting a low molecular weight lignin from the Organosolv process with phenol in a weight ratio of 1:20 to 3:1 at 100° to 180° C., adjusting the pH to an acidic value and condensing the mixture with 0.2 to 0.9 moles of formaldehyde per mole of phenol at 60° to 120° C. to form the binding agent, intensively mixing the resulting ligninphenol novolac with a phenol novolac in a weight ratio of 10:90 to 90:10 at 100° to 200° C., cooling and optionally drying the homogeneous mixture and granulating or finely grinding the mixture to form a powdered binding agent. These mixtures are useful as binding agent mixtures in textile fleeces, friction coatings, refractory compositions and curable molding compositions.

The sulfur-free lignin produced by the Organosolv process under comparatively mild conditions has a relatively low mean molecular weight since its chemical structure has been changed only slightly by the effect of the process conditions. The main portion of the lignin isolated in the Organosolv process through extraction has a mean molecular weight of approximately 500 to 3,000 while only small amounts have mean molecular weights of 18,000 to 20,000 and more. In the strongly alkaline black liquor of the second extraction stage, in contrast, there are comprised only lignins having mean molecular weights of 1,000 to 4,000. Through simple technical measures, fractions having lower mean molecular weights can also be obtained as well.

It has now been found that the lignin fractions of the Organosolv process with low mean molecular weight can be modified through prereaction with a phenol and subsequent condensation with an aldehyde to form high-quality resins which can be mixed in a simple manner with a phenol novolac and potentially other additives to form binding agents which, when worked into molding compositions, yield after curing a particularly good bond between the lignin-modified binding agent and the added filler substances.

Molded parts produced in this way, in contrast to previously known Organosolv lignin-phenol novolac binding agents mixtures, surprisingly have good mechanical, thermal and electrical properties which correspond to those of molded parts produced with conventional non-modified phenol resins. Especially good properties are evident in the use of the binding agent mixtures of the invention for the production of refractory compositions since they lead to high green stability under load and surprisingly high carbon yields.

For modification, preferably powder-form isolated lignins are converted with phenol and formaldehyde. Resins with particularly good properties are preferably obtained if lignins with molecular weights of less than 2,000 are converted.

For the production of the binding agent of the invention, the separated lignin fraction is mixed with phenol at a weight ratio of 1:20 to 3:1 in solution and is treated thermally at a temperature of 100° to 180° C. Then, the pH-value of the solution is adjusted to a value less than 4. As acids for regulating the pH-value or as catalysts for novolac condensation, all customary acids can be used. Particularly preferred for this purpose is oxalic acid. Then, 0.2 to 0.9 mole of formaldehyde per mole of phenol is added and the condensation is carried out at 90° to 100° C. The novolac is separated in a manner known per se by distilling off the water and it is subsequently potentially washed again and dried, ground and pulverized.

In this way, a lignin-phenol novolac is obtained which can be further processed as such for the production of high-quality molding and pressing compositions. But it can also be mixed with a phenol novolac produced by known processes and processed to form refractory compositions, curable molding compositions, friction coatings or textile fleeces.

For the production of the binding agent mixtures, a conventional phenol novolac is mixed with the ligninphenol novolac binding agent and the two novolacs are intensively mixed with one another at a ratio of 10:90 to 90:10, preferably 30:70 to 70:30. These mixtures can be dissolved in a solvent such as methanol, ethanol, isopropanol, acetone, furfuryl alcohol, ethylene glycol or others at a ratio of weights of 30:70 to 70:30, preferably 45:55 to 55:45. As a solvent, furfuryl alcohol is used preferably since it is not only active as a solvent but also in special cases, it can serve as a reaction partner during the curing.

For this purpose, all condensation products produced in an acidic medium based on phenols, cresols, and bisphenols with formaldehyde in a molar ratio of phenol to formaldehyde of 1:0.8 to 1:0.2 can be used as the novolac. Mixing the two novolacs can take place in a manner known per se. It has a favorable effect if it takes place under the influence of high shear forces at temperatures of 100° to 200° C., preferably 130° to 160° C. For this purpose, the premixed novolac mixture can be placed onto heated cylinders. After a rolling time of approximately 2 to 10 minutes, a cohesive rolled sheet will form which can be removed and which, after cooling, is ground to form a granulate with a grain size less than 2 mm.

But the raw mixture can also be mixed in heatable devices used in a manner known per se and customary for such processes, such as in a twin screw extruder, trough or tub kneader or in a co-kneader. The temperature is set so that a good mixing of the individual components with each other takes place, but so that neither a breakdown of the material used nor a premature curing of the resin mixure takes place.

In this work process, a homogeneous product is obtained which after cooling to room temperature, can potentially be dried and pulverized and which is highly suitable as a binding agent or binding agent component for press compositions, curable molding compositions, refractory compositions, friction materials or textile fleeces.

For further processing, 4 to 14% by weight of a curing agent, preferably hexamethylenetetraminem can be added to this binding agent mixture. Suitable curing agents are also reactive resins such as epoxy resins, phenol resols, amino resins and their mixtures. In addition, 0.05 to 1.2% by weight of a slip and parting agent, 4 to 90% by weight of filler materials, and also 0 to 20% by weight of fiber materials such as glass fibers can be added.

As slip and parting agents, Me stearate (Me=Al, Ca, Mg, Li, Zn) are added in quantities of 0.1 to 0.8 percent by weight and wax in quantities of 0.1 to 0.8% by weight, preferably amide wax, ester wax, montan wax or hard paraffin. For improving the rolling behavior of the duroplastic molding compositions, chalk is preferably mixed in as filler material.

In the following examples, there are described several preferred embodiments to illustrate the invention. However, it should be understood that the invention is not intended to be limited to the specific embodiments.

EXAMPLE 1

3 kg of phenol and 2 kg of lignin obtained in the Organosolv process having a sinter point of approximately 110° C. and a mean molecular weight of approximately 1100 were mixed with 50 g of oxalic acid and the mixture was held for two hours at a temperature of 150° C. Then, cooling to 100° C. took place and at this temperature while refluxing, 1.45 kg of formalin (45%) were added dropwise over a period of 2½ hours. Reflux was continued until the content of free formaldehyde of the reaction solution was less than 0.3%. Then, water and monomers were distilled off until the content of free phenol in the resin melt was 0.5% and the resulting lignin-phenol resin had a melting point of approximately 90° C. The resin was removed and after cooling, was finely crushed, pulverized in an impeller breaker and mixed homogeneously with 6% of hexamethylenetetramine.

EXAMPLE 2

760 g of powdered resin of Example 1 were mixed intensively with a mixture of 2 kg of steel wool, 1 kg of brass shavings, 700 g of coke, 320 g of graphite, 320 g of polyaramide fiber (2 mm), 180 g of glass fibers (2 mm), 1 kg of barium sulfate, and 500 g of magnesium oxide. The mixture was used in the conventional manner for the production of friction coatings. The friction value determined using test samples which had been pressed for 30 seconds per 1 mm/layer thickness at 170° C. and had been cured for 10 hours at 200° C. was approximately 0.40.

EXAMPLE 3

70 parts by weight of a textile fiber mixture were thoroughly mixed with 30 parts by weight of the powdered resin of Example 1. For the production of fiber fleece, the material was subjected to an aerodynamic fleece formation and deposited on a punched screen sheet. The uncured textile fleece form was precured in a heating cabinet at approximately 120° C. and then was pressed in a press at 180° C. to form sheets of 250 mm × 250 mm. The sheets were compared with respect to strength (load and permanent deformation) and odor with production sheet material in which unmodified powder resin based on phenol resin had been used.

Comparison of strength

No differences were observed.

Comparison in the odor test (odor test according to Ford)

Grade 1.9 to 2.3 using powdered resin of the invention, grade 2.2 to 2.6 material from the production with unmodified powdered resin (odor quality increased with decreasing grade).

EXAMPLE 4

5 kg of phenol and 5 kg of lignin fraction obtained in the Organosolv process having a melting point of 80° to 82° C. according to DIN ISO 10082 and a mean molecular weight of approximately 800 were heated to 150° C. and maintained at that temperature for 2 hours. Then cooling to 100° C. took place and 100 g of oxalic acid were added at reflux. 2.4 kg of formalin (45%) were added dropwise over a period of 3 hours and reflux was continued until the content of free formaldehyde of the reaction solution was less than 0.3%. Then, water and monomers were distilled off until the content of free phenol in the resin melt was <0.5%. The resulting lignin-phenol resin had a melting point according to DIN ISO 10082 of approximately 90° C. The resin was removed and, after cooling, was crushed into small pieces.

EXAMPLE 5

3 kg of the resin of Example 4 were dissolved with 3 kg of phenol-novolac resin having a melting point according to DIN ISO 10082 of 80° C. in 4 kg of absolute furfuryl alcohol. The solution contained less than 0.2% water.

EXAMPLE 6

11.14 kg of a mixture of dolomite of diverse grain size were homogeneously mixed with 60 g of hexamethylenetetramine and 800 g of the resin solution of Example 5. After pressing to form molded bodies, a cold compressive strength of approximately 80 N/mm$^2$ resulted. The synthetic resin-bound molded bodies were subsequently heated to a temperature of 180° C. and cured in the process. They had a strength which was so great that they could be readily transported and installed in units. The dolomite bodies could also be stored without breakdown and the determined cold flexural strength of the cured molded bodies was approximately 22 N/mm$^2$. Temper experiments up to 100° C. carried out in conjunction with molded bodies resulted in a carbon content of 54% relative to the resin content of the resin solution of Example 5.

EXAMPLE 7

4 kg of the resin of Example 4 were ground and thoroughly premixed with 2 kg of phenol-novolac having a melting point according to DIN ISO 10082 of approximately 85° C., 750 g of hexamethylenetetramine, 18 g of montan wax, 60 g of amide wax, 10 g of calcium stearate and 7 kg of soft wood dust and the mixture was placed onto cylinders heated to 100° to 130° C. The substance was densified within a rolling time of approximately 3 to 4 minutes to form a cohesive rolled sheet and homogenized. The resulting rolled sheet was pulled off and after cooling, ground to form a granulate of <2 mm. The granulate was molded in the pressing process to form molded bodies and cured. The physical values of the molded bodies were considerably above the scope of the phenol resin molding compositions of type 31 according to DIN 7708. Molded parts produced with it were distinguished by a good surface.

Various modifications of the products and method of the invention may be made without departing from the spirit or scope thereof and it is to be understood that the invention is intended to be limited only as defined in the appended claims.

What we claim is:

1. A process for the preparation of a binding agent mixture comprising reacting a low molecular weight lignin from the Organosolv process with phenol in a weight ratio of 1:20 to 3:1 at 100° to 180° C., adjusting the pH to an acidic value and condensing the mixture with 0.2 to 0.9 moles of formaldehyde per mole of phenol at 60° to 120° C. to form the binding agent, intensively mixing the resulting lignin-phenol novalac with a phenol novolac in a weight ratio of 10:90 to 90:10 at 100° to 200° C., cooling and optionally drying the homogeneous mixture and granulating or finely grinding the mixture to form a powdered binding agent.

2. The process of claim 1 wherein the weight ratio of lignin-phenol phenol novolac to phenol novolac is 30:70 to 70:30.

3. The process of claim 1 wherein the intensive mixing is effected at 130° to 160° C.

4. The process of claim 1 wherein the intensive mixing is effected with a kneader or extruder under high shear forces.

5. The process of claim 1 wherein the lignin-phenol novolac and the phenol novolac are dissolved in a weight ratio of 30:70 to 70:30 in a solvent selected from the group consisting of methanol, ethanol, isopropanol, acetone, furfuryl alcohol and ethylene glycol.

6. The process of claim 5 wherein the weight ratio of lignin-phenol novolac to phenol novolac is 45:55 to 55:45.

7. A binding agent mixture produced by the process of claim 1.

8. A binding agent mixture of claim 7 also containing a curing agent selected from the group consisting of hexamethylenetetramine and a reactive resin selected from the group consisting of phenol resol, epoxy resin and nitrogen containing polymers.

* * * * *